Aug. 21, 1951 A. E. ADLER 2,565,192

INTERCOMMUNICATION TELEPHONE SYSTEM

Filed Feb. 28, 1950 2 Sheets-Sheet 1

INVENTOR
ADOLF ERWIN ADLER
BY [signature]
ATTORNEY

INVENTOR
ADOLF ERWIN ADLER
BY Paul Kolisch
ATTORNEY

Patented Aug. 21, 1951 2,565,192

UNITED STATES PATENT OFFICE 2,565,192

INTERCOMMUNICATION TELEPHONE SYSTEM

Adolf Erwin Adler, London, England, assignor to Modern Telephone Corporation, New York, N. Y., a corporation of New York Application February 28, 1950, Serial No. 146,725
In Great Britain March 1, 1949

25 Claims. (Cl. 179—39)

This invention relates to intercommunication telephone systems. Such systems usually operate with common ringing and talking batteries, and to provide secret intercommunicating it has been proposed to use a test relay in each station to allow the calling up of a wanted free line, the calling circuit and the circuit for the eventual talking being completed over the home line of the called station.

In known secret direct call intercommunication systems the test relay is not adapted to block the called line during the ringing period and if, therefore, other parties are ringing it at that time, a non-secret intercommunicating will result.

An object of the present invention as to provide secrecy for intercommunicating telephone systems of the type referred to with means for blocking a selected free line against interference during the calling period as well as when communication has been established.

According to this invention, in an intercommunication system having common talking and ringing batteries, calling and talking circuits being completed over the home line or lines of the called station, there is provided at each station a test relay to effect the calling up of a wanted free line and establish subsequent secret intercommunication which relay is operable at a calling station on calling up of the wanted station over the free line to prepare the eventual intercommunication circuit and to so change the potential applied to the calling circuit which includes said free line as to prevent the operation of the test relay of any further station over the same line.

The aforesaid relay in one arrangement may be arranged upon attracting to connect a low resistance shunt across a high resistance in the calling circuit at the calling station to reduce the impedance of the calling circuit at that station.

In a system having handset circuits in each station capacitively connected to the calling circuit, the home line of the called station may include speech current retardation means arranged also to form a circuit keeping the test relay of the calling station energised after the called station has replied to the call.

The invention allows the use of single-coil test relays and resistors as testing, blocking and speech current retarding means and also use can be made of the relay in the called station to provide a local ringing circuit there.

The invention is particularly advantageous in its application to intercommunication systems in which the microphone and telephone feeding and talking circuits are arranged in the form of a substantially balanced Wheatstone bridge with the receiver across one diagonal, the transmitter in parallel to one leg of the bridge and the capacity coupling the talking circuit to the calling circuit connected to the junction of the receiver and microphone, as is described and claimed in patent application Ser. No. 121,154, patented July 10, 1951, No. 2,559,778. This bridge circuit allows the two talking battery wires to be used jointly as return circuit for speech currents, thus greatly reducing the resistance of the common speech return and minimising crosstalk derived from this circuit component, thereby obviating one of the disadvantages of known systems in which the secrecy obtained by using a test relay is offset by the cross talk through the signalling circuit.

Further features of the invention will be apparent from the following description of a number of embodiments thereof reference being made to the accompanying drawings in which.

Where possible the same components have been assigned the same characters. Thus in Figures 1, 2 and 3 the terminals marked +TB and — are the terminals of a talking battery of, for example, 3-4.5 volts and in Figures 1, 3 and 6, the terminals +SB and — are the terminals of a signalling battery of, for example, about 30 volts. The talking battery and the signalling battery are common to all stations of the intercommunication system. The two positive poles of the batteries may be linked. The intercommunication lines I/C are multipled over all stations, and are connected to the terminals HL10 and I/C11. The terminal HL10 is connected to the home line of the particular station, there being a different line for each station. A handset HS with its microphone and telephone is connected to the impedance legs of a Wheatstone bridge circuit BC12. The microphone feed circuit connection to the talking battery TB is controlled by contacts H1 of a gravity switch. Also connected to the bridge circuit BC12 is a coupling capacity C13 through which, as explained later, the speech circuits are made. The gravity switch has further contacts H2 in Figure 1 and H2 and H3 in Figure 3 which are shown in their rest position and substantially in alignment.

Figures 3, 4, 5:
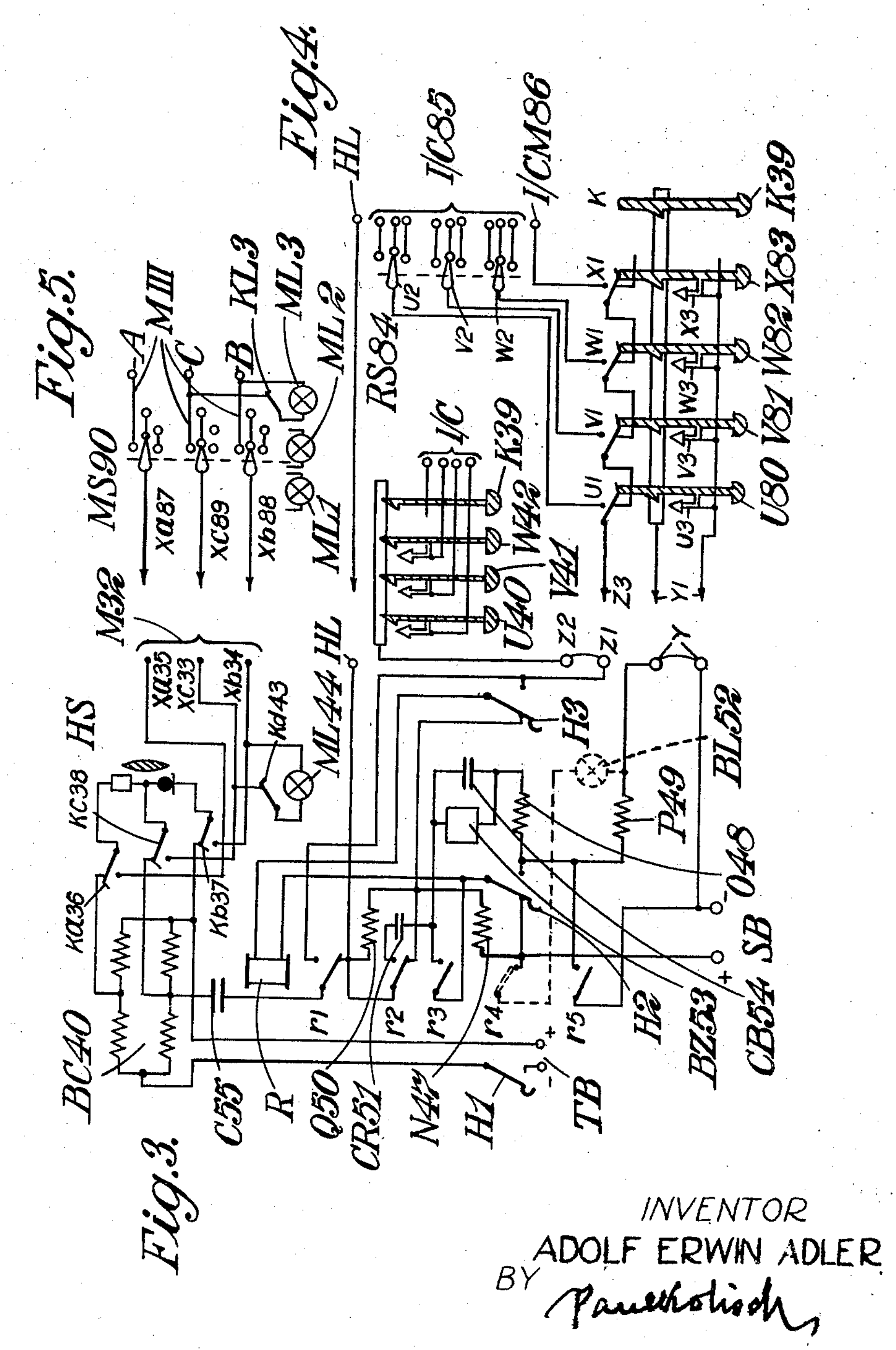
Figure 3 is a diagram of a telephone station with a single-coil test relay.
Figures 4 and 5 are diagrams showing modifications of the selector and ringing arrangement of Figure 3

Each telephone instrument is provided with a buzzer BZ14 or the like calling means. As selecting means interlocking press-buttons U15, V16, W17, are shown, which press-buttons are also interlinked in known manner with the gravity switch so that any previously selected circuit to a line I/C is opened upon replacing the handset HS. Any suitable mechanical interlocking and interlinking arrangement can be chosen and the schematic illustrations of Figures 1, 3 and 4 are only shown as examples.

Figures 1, 2, 6:
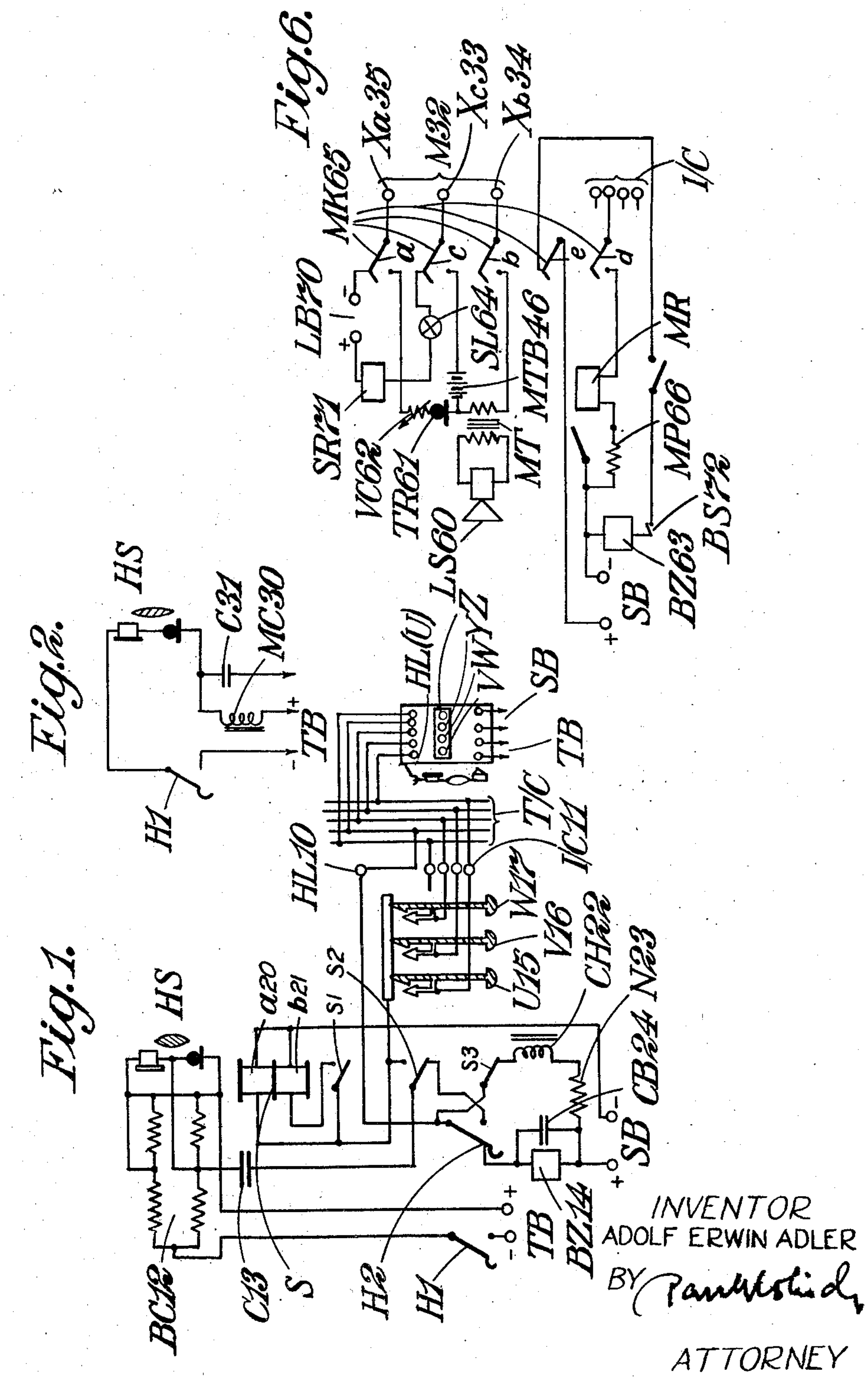
Figure 1 is a diagram of a telephone station with a two-coil test relay showing also part of the intercommunication multiple and another station connected to it.
Figure 2 is a diagram showing a modification of the handset circuit of the station shown in Figure 1.
Figure 6 is a diagram of a loudspeaking master station.

Each substation and also each master station (as described later with reference to Figure 6) is provided with a relay, and referring now to Figure 1 this relay S is fitted with two windings, one winding *a*20 being of high resistance and the other winding *b*21 being of low resistance. The contacts *s*1, *s*2, *s*3 of the relay are actuated in known manner, upon energisation of the relay windings, by the relay armature and are shown in their rest position, substantially in alignment with the relay coils. The relay S is of the fast working type.

Also in Figure 1 is shown a choke coil CH22 which serves as retardation means for speech currents. The choke CH22 can also be connected in line with, or replaced by, equivalent means such as a resistor and/or rectifier.

In operation an intercommunication system comprising a number of stations as shown in Figure 1 works as follows:

Upon lifting the handset HS, so actuating the switchhook or gravity contacts H1 and H2, two circuits are prepared; at H1 the microphone feeding circuit from battery TB is closed, preparatory to the talking connection, and at H2 the local buzzer BZ14 is interrupted. Next, upon depressing one of the buttons, U15, V16 or W17 one of the intercommunication lines I/C which are multipled over all other stations, is selected and as each of these lines ends as a home line HL10 in a different station, a circuit will be closed for the buzzer BZ14 at the selected station, provided such station is disengaged or free. A station is disengaged, or free, when its switchhook contacts are at rest and no circuit for calling it from another station had previously been closed.

The calling circuit when station Y calls station U runs as follows:

SB— winding *a*20 of relay S at the calling station Y, bar and contact of selecting button U15, line I/C, HL(10) of wanted station, contact H2, buzzer BZ14, +SB.

In the calling station, the relay S attracts over it winding *a*20 and its contact *s*1 closes so connecting the low resistance winding *b*21 in parallel with the high resistance winding *a*20. This will reduce the overall resistance in the calling circuit to such an extent that the buzzer BZ14 of the wanted station is able to sound. The buzzer shunt circuit composed of break contact *s*3, choke CH22 and a high-ohmic resistor N23, and also the parallel condenser CB24, do not effectively interfere with the operation of the low resistance buzzer. Any other station trying also to close this calling circuit will find the winding *a*20 of its relay S partly shunted. If the third party's relay S when placing its winding *a*20 in parallel with the shunted relay S of the first station, should be able also to pull up its armature, one of the two relays S will eventually release upon the called station replying, for then the low-ohmic buzzer circuit is replaced by the high-ohmic impedance combination CH22, N23, which permits only one relay S to hold its armature. Likewise, if the third party during this ringing period tries to call the first calling station Y over its home line HL(10) no call can be received owing to contacts H2 and *s*3 having interrupted the calling circuit. Contact *s*2 in this calling station also keeps the talking circuit from interference if third parties try to connect when conversation is proceeding.

The talking circuit, which is connected to the bridge circuit BC12 and ultimately the handset HS via the coupling condenser C13, is switched over at contact *s*2 to the selected line. The sound of the buzzer BZ14, self-interrupting in the called station, is now transmitted back to the calling station and becomes audible in the receiver, as ringing tone.

At the called station, upon lifting the handset in response to the call, the buzzer circuit is interrupted. Yet, as contact *s*3 at the called station is not broken, the circuit to +SB over choke CH22 and resistor N23 remains connected to the home line to hold the calling station's relay S energised over both its windings. The microphone feed circuit will, at contact H1, be closed locally over bridge circuit BC12, and the talking circuit finally is completed via the coupling condenser C13 and the back contacts *s*2 of the relay S, which at the called station does not attract. At the called station, the choke CH22 acts as a retardation means for the speech currents passing the home line HL during conversation. It will be appreciated, however, that other retarding means can be employed. In the calling station, the inductance of relay S will act as the retardation means.

By keeping the impedance combination CH22 and N23 in circuit and holding the test relay S in the calling station, any interference by another station to the intercommunication established between two stations is prevented, since, as previously explained, the relay S of the third station is not then able to attract over the high impedance circuit. Contact *s*2 at the third station will not switch-over to connect the third party's talking circuit and therefore secrecy is ensured.

Figure 2 is a diagram of a modification of the handset circuit of Figure 1. In this modified circuit a series connected receiver and transmitter for the handset HS is provided, a local microphone feed being completed from battery TB via the hook switch contact H1 and choke MC30 which serves as a retardation means for speech currents. The handset circuit is connected by the coupling condenser C31 to the contact *s*2 (Figure 1) of the talking circuit. It will be seen that the circuit of Figure 2 is rather simpler than that of Figure 1. It is preferred, however, to employ the latter since the talking circuit which is led via the condenser C13 to the intercommunication line has a return line comprising the two lines of the battery TB in parallel. In the circuit of Figure 2 on the other hand the return line comprises only the negative lead of the battery TB. Thus in the arrangement of Figure 1 using the bridge circuit BC12 and a common return, the line resistance of the return line is approximately half that of the return line of Figure 2 resulting in an appreciable reduction of crosstalk, which is especially noticeable in extended networks. Thus the secrecy of the telephonic intercommunications is further ensured.

Figure 3 is a circuit diagram of a telephone station having a single coil test relay and arranged for intercommunication both with other similar stations and with a master station (Figure 6) having loudspeaking facilities and visual call signals. Communication to the master station is over a three wire line M32 which at the master station has a loudspeaker connected between lines Xc33 and Xb34 whilst a sensitive microphone is connected between lines Xa35 and Xc33. Change-over contacts Ka36, Kb37 and Kc38 of a press-button switch K39 are arranged so that the three wires of the handset HS are switched over from the Wheatstone bridge circuit BC40 to the lines Xa35, Xb34 and Xc33 of the three wire line M32 when the button K39 is depressed. The button K39, which is interlocked with the buttons U40, V41, W42 also has a break contact Kd43 which lies in a circuit including an indicator lamp ML44. The microphones both of the master station and of the station shown in Figure 3 are fed by a separate battery MTB45 (Figure 6) in the Xc lead and this battery can also conveniently serve to light the lamp ML44 over the leads Xc33 and Xb34 when calling the particular instrument.

The relay R of Figure 3 has only one winding and its contacts *r1* to *r5* are shown in their rest positions. These contacts upon energisation of the relay winding are actuated by the armature of the relay which, like the relay S of Figure 1, is of the fast working type, with contacts *r5* closing last.

The same reference letters are used in Figure 3 as in Figure 1 to indicate corresponding components. It will be seen that in addition to the resistance N47, in the arrangement of Figure 3 there are provided further resistors O48, P49 and Q50 the purpose of which will be explained later. Also a condenser CR51 is provided to pass a ringing tone so allowing an acoustical check on the working of the buzzer of a called station, as also is explained below.

In Figure 3 a circuit for a lamp BL52 is shown by dotted lines and also strapped points *y*—*y* and $z_1$—$z_2$ are marked. The lamp can be provided and the straps are to be removed when employing the modified circuit of Figure 4.

The circuit of Figure 3 operates in the following manner:

At the calling station, upon lifting the handset HS, the microphone feeding circuit is closed over the contact H1, the bridge circuit BC40 and the back contacts Ka36, Kb37, Kc38 of the master-button K39 which interlocks with the intercommunication buttons U40, V41, W42. The change-over contact springs H2 and H3 are connected to the relay R, the coil of which is normally shunted by the high-ohmic resistor N47 which is connected over the back contacts of H2 and H3.

The back contact of H2 is further extended to terminal +SB, whilst the back contact of H3 extends via a resistor Q50, which is normally shunted by the back contact *r2*, to the home line HL and also to the back contact *r1*.

The front contact of H2 leads, on the one hand via a series resistance O48 to the buzzer-condenser combination BZ53, CB54 and on the other hand via the resistor P49 and the strap between points *y*—*y* to the terminal —SB. The resistor P49 eventually is shunted by contact *r5* which closes last upon operation of the relay R. The front contact of H3 connects both to the front contact *r1* and to the common bar of the buttons U40, V41, W42, via strap $z_1$—$z_2$.

Thus, upon contact H2 changing over the circuit leading to +SB is interrupted and a shunt prepared for a local circuit for the buzzer BZ53, this shunt circuit eventually being completed by contact *r3*. When the contact H3 changes over the following calling circuit is prepared, to be completed by depressing one of the interlocking buttons U40, V41 or W42: —SB, strap *y*—*y*, resistor P49, H2, relay R, H3 strap $z_1$—$z_2$, bar and contact of selecting button, terminal and line I/C, HL of wanted station, *r2*, H3, relay R, H2, +SB.

The relays R of both the calling and the called station will attract in the traced circuit; the high resistance N47 in parallel to the coil of relay R in the called station does not appreciably affect its sensitivity. In the calling station contact *r5* shunts the resistance P49, whilst in the called station contact *r2* opens the shunt across its resistance Q50. The value of the resistors P49 and Q50 are of approximately the same order.

In the selected station the call is received at buzzer BZ which is locally switched in by contact *r3* as follows: +SB, H2, *r3*, buzzer BZ53, resistor O48, *r5*, —SB.

At the calling station, the buzzer is kept silenced since it is shunted by front contacts H2 and *r3*. The series resistance O48 reduces the working voltage of the self-interrupting buzzer at the called station and the parallel condenser CB54 serves to smooth voltage peaks in the local circuit of the buzzer. This will reduce cross-talk intereference through induction into neighboring lines I/C, when in the called station, the front contact of contact *r2* connects the buzzer circuit via condenser CR51 to the home line HL.

In the calling station, the capacitively connected talking circuit becomes switched through by contact *r1* so that the sound can be overheard, as a ringing tone, in the handset HS of the caller.

A third station trying now to call the station initiating the first call or the one already being called, is prevented from doing so. A third station trying to reach the calling station over its home line will become connected to the two resistances Q50 and N47 in series instead of to the relatively low resistance of the relay R. The combined resistance of Q50 and N47 is too high to permit the relay R of the third station to attract when these resistances are in circuit. On the other hand, when trying to reach an already-called station through shunting of the resistance P49, the remaining low resistance of the relay R of the calling station will effectively prevent other relays R still in series with their resistor P49 from attracting in parallel over the home line of the already called station where the resistance Q50 has now been inserted in series with the called instrument's relay R.

At the called station, upon lifting the handset HS in reply to the call, the contacts H2 and H3 change over, so de-energising the relay R at this station but the resistor N47 remains in line. The resistance value of N47, even after the series resistor Q50 has again become shunted by the replacing of contact *r2*, is sufficiently high to cause a current distribution over the home line HL such that no third party can now bring in its relay R upon attempting to call or overhear.

In the called station, at contact r3, the buzzer circuit is interrupted and at contact r2 the coupling circuit for transmitting the ringing tone back to the calling station is interrupted. The back contact r2, connects the home line HL to the talking circuit, this circuit being completed at both calling and called station via condensers C55 to the local feeding bridge circuits BC40 and handsets HS.

The resistor N47 of the called station, and in the calling station the inductance of relay R, will remain connected to the home line each acting as a speech current retarding during conversation.

Instead of strapping the points *y—y*, a separate calling push can be provided, connected across these points and arranged so that it will, upon being depressed after line selection has been performed by buttons U40, V41, W42, start a call by closing the calling circuit traced above. If such calling buttons are provided the contact r3 can be omitted. In this case the lamp BL52 shown in the dotted circuit can also be used. This circuit is completed over break contact r4. If, therefore, relay R in the calling station is unable to attract because of the selected line already being engaged, the ringing push bridging the points *y—y* will close the local circuit for the lamp BL52 to indicate this engaged condition. It will be appreciated that even without the lamp BL52 being provided, the absence of the ringing tone will be an indication of the engaged condition.

The three handset connections to the leads X*a*35, *b*34, *c*33 of the three-wire line M32 lead to a loudspeaker master station Figure 6. The master station employs a separate talking battery MTB46 in the X*c*-line and this battery can also be used for lighting a calling lamp ML44 (Figure 3) placed between the lines X*b*34 and X*c*33, the lamp circuit being completed via the break contact K*d*43 of the master button K39, when calling a particular substation. The master station comprises a loud-speaker LS60, a sensitive microphone TR61, a speaker matching transformer MT, and a volume control VC62 for outgoing speech. Apart from a sounding buzzer BZ63 in a local circuit controlled by a relay SR71, as will be explained, visual call signals SL64 individual to the substations connected, are provided. Keys MK65 are provided, one allotted to each substation for calling it up, or replying to a call.

The master is connected to the common battery SB which supplies current for the buzzer circuit, and also for testing purposes. A test relay MR is provided with a resistance MP66 in series. The resistance value of relay MR and that of MP66 correspond to those of relays R and resistor P47 in the substations. Relay MR will also act as a choke to retard speech currents that pass an engaged intercommunication line to which the master can make connection. A contact *mr* of relay MR is adapted to shunt the series resistance MP66 to block substations that are called by the master.

The intercommunication multiple I/C can be reached by the master and used to vary the applied potential for blocking purposes.

A master calling a substation will, via blade contacts *b* and *c* of the corresponding key MK65 light the lamp ML44 there, and also, by applying over blade contact *d* a negative potential from SB—via resistor MP66 and relay MR to the home line HL of the called station, energise both the relay MR in the master and relay R at the called station where the buzzer BZ53 is made to sound. Reply will be made to the call by lifting the handset HS and depressing the master button K39 which is interlocked with the other buttons U40, V41, W42, whereupon the contacts K*a*36, K*b*37, K*c*38 and K*d*43 are actuated, and the relay R made to release, as was described above. In the calling master by means of contact *mr* which shorts out the series resistance MP66 the negative potential placed at the home line HL over relay MR during the ensuing conversation is changed to a degree such as to mark the line "engaged," so preventing energisation of test relay R of other substations which may try to call the engaged substation. However, if a substation is engaged with another substation, a master station can still call it by means of lamp ML44 only, which will urge the called substation to take over the preference call. A master can in the case of selecting an already engaged substation either abandon the call, or wait till the called substation releases in order to take over the preference master call. In that case relay MR will be able to attract over the home line of the now free substation and will also block the connection thus established by shorting out the resistor MP66 which was up to now in series with the relay MR, as was explained.

It is not necessary to replace the handset HS and mechanically release the locked button if the calling station intends immediately to start a second call. Whilst changing over from one line to the other, a time lag sufficient to let fast acting relay R drop its armature is interposed. By placing resistor P49 again in line with the relay R through contact r5 opening early, this will cause the relay R to release momentarily but will be ready for attracting in the new test circuit again to block the selected line. Similarly, also a waiting master call can be taken over simply by depressing the master button K39, which will release any substation selecting button U40, V41 or W42 previously held locked.

In order to call up a master station, a substation (Figure 3) by depressing button K39 switches the handset HS over to the three-wire line M32 leading to the master (Figure 6) thereby closing calling circuits for lamp SL64 and buzzer BZ63 (Figure 6) and preparing the loudspeaking circuit. Relay R in the calling station this time however does not attract as its circuit is not closed at the master; the resistance N47, however, becomes effective to change the potential applied to the home line so that other substations are prevented from calling it up in a similar way to that explained with reference to intersubstation conversations. The master, during the calling period, can be reached by third stations, when another calling lamp SL64, individual to their talking line M32, is also lit up.

The calling lamps SL64 in the master (Figure 6) are supplied by a battery LB70, and a common relay SR71 is provided. This relay SR71 will become energised when any one lamp circuit is closed over lines X*a*35 and X*c*33. Its contact *sr* will close a local circuit for the buzzer BZ63 in the master. This circuit includes a chain connection of all break contacts *e* of the substation keys MK65 in the master. Also a separate hand-operated key BS72 is provided to break the buzzer circuit at will, leaving only the visual call signals SL64.

The master will reply to a call by actuating the key MK65 allotted to the call lamp SL64. This will then become extinguished and relay SR71 made to release, whilst the talking circuits to line M32 is switched through over front contacts of blades *a, b, c*. At blade *d* the home line HL of the calling line (Figure 3) is extended to relay MR, which this time however in series with the resistance MP66 cannot attract, in line with the resistors Q50 and N47 of the calling substation. The buzzer circuit in the master will, upon reply to a call, become interrupted by blade contact *e*.

Figure 4 shows a modification of the circuit of Figure 3 in which the line selecting buttons U80, V81, W82, X83, instead of having interlocking make contacts, as in Figures 1 and 3, are provided with mechanically interlocking, electrically series-connected change-over contacts *u1*, *v1*, *w1*, *x1* for line selection, and make contacts *u3*, *v3*, *w3*, *x3* for calling purposes. These contacts *u3*, *v3*, *w3*, *x3* are making only upon the buttons being depressed in an overthrow action but remain open upon their release when they are kept locked in known manner. As above mentioned, in using the arrangement of Figure 4, the straps *y—y* and $z_1$—$z_2$ of Figure 3 are omitted and the points *y—y* are connected to the points *y1—y1* of Figure 4. Also the point *z3* in Figure 3 is connected to the point *z1* of Figure 3.

Figure 4 also shows how the capacity of the intercommunication system may be increased by providing in series with each front contact *u1*, *v1* and *w1* of the buttons U80, V81, W82, a wiper *u2*, *v2*, *w2* or the like, of a rotary selector switch RS84. The wipers of this switch, provide each a connection to any one of sub-groups of intercommunication lines I/C85. The wipers *u2*, *v2*, *w2* are mechanically coupled. They need no home position. The manual setting of the rotary selector RS84 selects a particular line amongst groups of intercommunication lines I/C85, the group being determined by operation of one of the buttons U80, V81, or W82, the series contacts *u1*, *v1* or *w1* of which serve to switch-through via a particular wiper to the wanted line. Such arrangements, comprising group- and line-selecting means allow readily to increase the number of intercommunication lines without unduly complicating the stations. However, the risk of crosstalk when using multiple cables for such extended networks becomes greater and therefore the circuit of Figure 2 is to be avoided and instead, the bridge circuit BC for the talking circuit as in Figures 1 and 3 is preferred in this case. In practice, the rotary switch RS84 is set before manipulating one of the buttons U80, V81, W82 by fully depressing a button and thus closing the contacts *u3*, *v3*, *or w3*, the wanted line is called up. Instead of using separate paralleled ringing contacts *u3*, *v3*, *w3* as shown in Figure 4, closing upon the overthrow of any one group-selecting button U80, V81, or W82, a common push button separate from the group-selecting row of buttons U80, V81, W82 and line-selecting rotary switch RS84, can be provided to be actuated after both group and line selection means have been set, in any sequence.

Not all of the contacts *u1*, *v1*, or *w1* need be connected to wipers of *u2*, *v2*, or *w2* of the rotary selector switch. Certain buttons such as X83, also interlocking with the remaining ones U80, V81, W82, can connect by means of their change-over contact *x1*, to a terminal for a particular line I/C*m*86 amongst the group of intercommunication lines.

Alternatively, the interlocking button X83 can be set aside to perform switching duties, for instance when it is desired to signal or connect to a special line or telephone set of the intercommunicating system. It will be appreciated that similar facilities for connection to a master station by means of a master button K39 could be provided in the arrangements of Figures 1 and 2.

Provision may be made for connecting more than one loudspeaker master line. For this purpose, as shown in Figure 5, the terminals X*a*35, X*b*34, X*c*33 are connected to the three wipers *xa*87, *xb*88, *xc*89 of a rotary selector switch MS90. These wipers, preferably, are mechanically coupled with the wipers *u2*, *v2*, *w2* of rotary switch RS84 of Figure 4. The combined selector switch RS84/MS90 is preferably of the rotary non-resetting multi-level wafer type.

Wipers *xa*87, *xb*88, *xc*89, can be set onto any one group of terminals A, B, C, of three-wire lines MI, MII, or MIII leading to three master telephones; the talking circuit then will be switched through by pressing button K39 and so actuating its change-over contacts K*a*36, K*b*37 and K*c*38. In this example of three master-lines connected instead of the one additional break contact K*d*43 as shown in Figure 3, three break contacts K*d*1, K*d*2 and K*d*3 (of which only K*d*3 is shown) are provided in the various lamp circuits for signalling individually incoming master calls. The three lamps ML1, ML2 and ML3 are indicated, the latter shown in circuit with the break contact K*d*3 actuated by master button K39.

The selecting front contacts *u1*, *v1*, *w1* and *x1* of buttons U80, V81, W82 are electrically interconnected by series connecting their back contacts. This will present double connections and the possibility of interference, in the case of two buttons being simultaneously depressed and held locked. This way of interconnecting the buttons could also be adopted in the arrangements of Figures 1 and 3.

Button K39, as a master-selecting button, will not be electrically interlinked with the substation buttons U80, V81, W82, X83 although it will still be mechanically interlocked with these buttons. In order to call and connect to a particular master, the combined distributor switch RS84 and MS90 is set first to the position required and then the button K39 depressed for connecting through to the particular line within the group of master lines MI, II, III.

When replying to an incoming call, no action is normally required apart from lifting the handset HS. In substations according to Figure 5, master-calls, however, have to be answered by first setting switch MS90 to the position indicated by the calling lamp ML1, ML2 or ML3 and subsequently depressing the master-button K39 to operate the contacts K*a*36, K*b*37, K*c*38, K*d*1, K*d*2, K*d*3, connecting the handset HS to the three-wire talking circuit and extinguishing the calling lamp.

To release a call, either upon connecting to an engaged line, or when no reply to a call is obtained, or else after a conversation has taken place, all that is necessary is to replace the handset. This will mechanically release any button so far held in the locked position and, by changing back the switchhook or gravity contacts, open the circuits for the test relays, for the buzzer and/or microphone feeds. In master calls, initiated or replied to by manipulating individual station keys MK65, these will upon restoring also return the circuits for the buzzer and lamps, and the talking circuit over the three-wire interconnecting line, to the position shown in Figure 6.

I claim:

1. An intercommunication telephone system comprising a plurality of stations each having a telephone instrument including a receiver, microphone, and signalling means, an intercommunication multiple of line wires having one home line allotted for each station, and selecting means to interconnect said instruments for calling and talking, a test relay at each station, a battery of such potential to energize at least the relay of a calling station in a circuit including a selected free line of the called station, means including contacts of the relay at the calling station to open the home line and connect the selected free line wire to the telephone instrument to prepare for subsequent secret intercommunication, resistances in the stations, and means including contacts of the relay placing said resistances in the circuit to change the potential applied to said calling circuit so as to prevent the operation of the test relay of any other station over the same line.

2. An intercommunication telephone system comprising a plurality of stations each having a telephone instrument including a receiver, microphone and signalling means, an intercommunication multiple of line wires having one home line allotted for each station, and selecting means to interconnect said instruments for calling and talking, a test relay at each station, means to energize the relay of a calling station in a circuit including a selected free line from the station being called, means including contacts of the relay at the calling station to open the home line and connect the selected free line wire to the telephone instrument to prepare for subsequent intercommunication, a high resistance in the calling circuit at the calling station and a low resistance shunt including contacts of said relay across said high resistance to reduce the impedance of calling circuit at the calling station during the period of calling and subsequent intercommunication with the wanted station.

3. In a telephone system, the combination of a plurality of stations each having a telephone instrument comprising a receiver, microphone, switch hook and signalling means, means including line wires to interconnect said instruments for calling and talking, a condenser at each station, a selector switch and a relay at each station to connect a line wire from another station to the telephone instrument, a direct current supply for energizing the relay of a calling station in a circuit including a selected free line of the called station, switching means including contacts of the relay at the calling station operable to reduce the resistance of the calling circuit at the calling station when calling another station, and means including switch-hook contacts and an associated impedance element in the called station operable to increase the resistance in the calling circuits at the called station when replying to a call and completing a talking circuit over the condensers at each station and said selected line wire.

4. A system according to claim 3 wherein said impedance element includes a reactance forming a speech current retardation means.

5. In a telephone system, the combination of a plurality of stations each having a telephone instrument comprising a receiver, microphone, switch-hook and signalling means, means including line wires to interconnect said instruments for calling and talking, a manually operable selector switch and a relay at each station operable to connect a line wire from another selected station to the telephone instrument, said relay having a high resistance winding and a low resistance winding, a direct current supply for energizing the relay of a calling station over its high resistance winding in a calling circuit, said circuit including a selected line wire and signalling means of the selected station, a shunt circuit across said high resistance winding including contacts of said relay and said low resistance winding so that the low resistance winding is connected in parallel with the high resistance winding when the relay attracts on completion of the calling circuit, an impedance element at each station, and means including switch-hook contacts operable to connect the impedance element in the calling circuit to increase the resistance of this circuit at a called station when replying to a call.

6. In a telephone system, the combination of a plurality of stations each having a telephone instrument comprising a receiver, microphone, switch-hook and signalling means, means including line wires to interconnect said instruments for calling and talking, a manually operable selector switch at each station to select a line wire of a wanted station, a relay at each station operable to connect the selected line wire to the telephone instrument, impedance elements at each station, a direct current supply for energising the relay of a calling station over a calling circuit, said circuit having means including a relay and switch-hook contacts at a called station, a local circuit for the signalling means at the called station controlled by said circuit means, said relays having means, when energised during the signalling period, to modify the connection of said impedance elements in the calling circuit to change the potential on the selected line wire thereby preventing the relay of a third station from becoming energized.

7. In a telephone system, the combination of a plurality of stations each having a telephone instrument comprising a receiver, microphone, switch-hook and signalling means, means including line wires to interconnect said instruments for calling and talking, a manually operable selector switch at each station to select a line wire of a wanted station, a relay at each station operable to connect the selected line wire of a wanted station to the telephone instrument of a calling station, means including said relay and switch-hook contacts for controlling a local circuit, said circuit including said signalling means, impedance elements at each station, means including a direct current supply for energising the relay of a calling station and the relay of a called station over a calling circuit, said circuit including the selected line and switch-hook contacts at the called station, said relays having means when energised during the signalling period, to change the potential on the selected line thereby preventing the relay of a third station from becoming energized.

8. In a telephone system, the combination of a plurality of stations each having a telephone instrument comprising a receiver, microphone, switch-hook and signalling means, means including line wires to interconnect said instruments for calling and talking, a manually operable selector switch at each station to select a line wire of a wanted station, a relay at each station operable to connect the selected line wire of a wanted station to the telephone instrument of a calling station, means including said relay and switch-hook contacts for controlling a local circuit, said circuit including said signalling means, a resistance at each station normally connected in parallel with the relay by switch-hook contacts, another resistance at each station in series with said relay, relay contacts normally shunting said other resistance, and a direct current supply for energising the relay of a calling station and the relay of a called station over a calling circuit, said circuit including the selected line and switch-hook contacts of the called station, so that the relay at the called station is energised only during the signalling period, and the calling circuit is completed over said first mentioned resistor so that during the signalling and talking period a potential is maintained on the selected line thereby preventing the relay of a third station from becoming attracted by energisation, in a direct current circuit containing a line wire extending to an engaged station.

9. In a telephone system, the combination of a plurality of stations each having a telephone instrument comprising a receiver, microphone, switch-hook and signalling means, means including line wires to interconnect said instruments for calling and talking, a manually operable selector switch at each station to select a line wire of a wanted station, a relay at each station operable to connect the selected line wire to the telephone instrument, impedance elements at each station, and a direct current supply for energising the relay of a calling station in a calling circuit, said circuit including a relay and switch-hook contacts at a called station, a local circuit at the called station controlled thereby, said local circuit having a direct current supply and self-interrupting sounding means to provide an audible signal, whereby the relays at each station are arranged, when energised during the signalling period, to modify the connection of said impedance elements in the calling circuit to change the potential on the selected line wire thereby preventing the relay of a third station from becoming attracted by energisation in a direct current circuit containing a line wire extending to an engaged station.

10. A system according to claim 9 in which there are provided means including a contact on the relay at a called station and a coupling condenser in series with said contact for coupling the local circuit to the line wire to pass the audible calling signal to the talking circuit of the calling station as a ringing tone.

11. In a telephone system, the combination of a plurality of stations each having a telephone instrument comprising a receiver, microphone, switch-hook and signalling means; a first direct current supply circuit for feeding said instruments; means including line wires to interconnect said instruments for calling and talking; a condenser at each station; a manually operable selector switch at each station to select a line wire of a wanted station; a relay at each station operable to connect the selected line wire of a wanted station to the telephone instrument of a calling station over said condenser, means including said relay and switch-hook contacts for controlling a local signalling circuit, said circuit including said signalling means and the first direct current supply; impedance elements in each station; switching means including contacts of the relay at a calling station to reduce the resistance of a calling circuit by shunting an impedance element in the calling circuit at the calling station, said calling circuit including the selected line wire and the relay winding at the called station; and means including switch-hook contacts in the called station to increase the resistance of the calling circuit, at that station when replying to a call, by connecting an impedance element into said circuit whereby the direct potential on said selected line is changed, thereby preventing the relay of a third station from attracting, when selecting a line wire circuit, extending to the engaged station.

12. A system according to claim 11 wherein said first direct current supply circuit comprises four impedances connected to form a Wheatstone bridge circuit with the microphone in one arm of the bridge, a second direct current supply source for the microphone connected to one pair of diagonally opposite junction points of the bridge, a circuit connecting the receiver to the other pair of diagonally opposite junction points of the bridge, and a condenser coupling the line wire circuit to the junction point on the bridge of the microphone and receiver.

13. In a telephone system, the combination of a plurality of substations each having a telephone instrument comprising a receiver, microphone, switch-hook and signalling means, means including line wires to interconnect said instruments for calling and talking, a manually operable selector switch at each station to select a line wire of a wanted station, a relay at each station operable to connect the selected line wire of a wanted station to the telephone instrument of a calling station, a master station having a loud speaking telephone with a sensitive microphone, a current supply circuit for the master microphone when communicating with any of the substations, a master talking circuit for connecting the master station to any of the substations, a separate master signalling circuit including a line wire to the substations, signalling means and a relay at the master station, impedance elements at each station, a direct current supply for energising the relay of a calling station in a calling circuit, said circuit including a selected line wire extending to the called station, and switching means at the calling station operable to change the resistance of the calling circuit thereby changing the direct current potential on the selected line wire and prevent the relay of a third station from becoming attracted by energisation in direct current circuit containing a line wire extending to an engaged station.

14. A system according to claim 13 and having additional lamp signalling means for the master connection, said lamp signalling circuits being independent of the relay circuits so that an engaged station may be called.

15. A system according to claim 14 wherein the master station has separate signalling lamps for indicating calls from each substation, separate keys for completing talking circuits to each substation, and a single audible signalling means controlled by contacts of the relay at the master station over a local circuit, said local circuit including the break contacts of all said separate keys.

16. In a direct line intercommunication telephone system, the combination of a plurality of stations each having a telephone instrument comprising a receiver and microphone handset, an intercommunication multiple of line wires having one home line allotted for each station, and selecting means to interconnect said instruments for calling and talking, a multi-wiper rotary non-resetting line selector at each station, means including interlocking buttons for completing connections to individual wipers and, upon an overthrow action, to close a direct current calling circuit over the particular line selected by the wiper for intercommunication between each station, a condenser in the calling station to separate the handset from the direct current calling circuit, a talking battery, a direct current battery feed circuit for each handset comprising a balanced bridge circuit connecting the receiver and microphone of the handset to its line and the talking battery, so as to reduce cross-talk between the lines of the intercommunication multiple in extended networks, served by said rotary selector, by providing a talking circuit that uses both microphone feed wires as joint return lines giving a low resistance return path.

17. In a direct line intercommunication telephone system, the combination of a plurality of substations and master stations, each substation having a telephone instrument comprising a microphone, receiver, feeding circuit and a capacitively coupled line connecting circuit, said circuit coupled by a substantially balanced four impedance bridge network, a switchhook with a switch-hook contact in the feeding circuit, each master station having a loudspeaker, sensitive microphone and master talking circuits comprising at least three wires extending to the receiver and microphone of each substation, a group of interlocking keys in each substation, a multiwiper non-resetting rotary selecting switch in each substation having individual wipers, each connected to a separate key of said group of interlocking keys for inter-substation connection through said bridge circuit and having at least three wipers for connecting the master talking circuits, selected by said rotary switch, to the handset of the substation through another of said interlocking keys.

18. In a telephone system the combination of a plurality of substations each having a capacitively coupled line wire extending to other stations and a telephone instrument comprising a receiver, microphone and switch-hook; master stations each having a loudspeaker, a sensitive microphone and a master talking circuit comprising at least three wires; signalling means and additional calling lamps in each station; means including a manually operable selector switch and a relay in each station to connect a line from another station to the telephone instrument; non-resetting additional switching means in each substation for completing connections to a selected master talking circuit; and means including locking key contacts in each substation mechanically releasable by the switch-hook to transfer the connection of the telephone instrument from the line wire circuit to said non-resetting additional switching means.

19. A system according to claim 18 wherein said non-resetting additional switching means comprises a rotary manually operable selector switch.

20. A system according to claim 18 wherein said non-resetting additional switching means comprises a rotary manually operable selector switch having at least three wipers, each wiper being connected to a front contact of said key contacts for transferring the connection of the telephone instrument to a master talking circuit having at least three wires.

21. In a telephone system the combination of a plurality of substations each having a capacitively coupled line wire extending to other stations and a telephone instrument comprising a receiver, microphone and switch-hook; master stations each having a loudspeaker, a sensitive microphone and a master talking circuit comprising at least three wires; signalling means and additional calling lamps in each station; means including a manually operable selector switch and a relay in each station to connect a line from another station to the telephone instrument; means including locking key contacts in the substations mechanically releasable by the switch-hook to select one group of line wires from another station, and non-resetting additional switching means for selecting and switching through to complete connections over an individual line wire.

22. A system according to claim 21 wherein said non-resetting additional switching means comprises a multiple wiper, manually operable rotary selector switch, each wiper being connected to one of a series of group selecting key contacts.

23. A system according to claim 22 and having a series of electrically interconnected group selecting keys each fitted with at least one change-over contact, the back contact of which lies in the chain connection of all the back contacts, the front contacts of said keys being connected respectively to the wipers of said rotary selector switch.

24. In a telephone system the combination of a plurality of substations each having a capacitively coupled line wire extending to other stations and a telephone instrument comprising a receiver, microphone and switch-hook; master stations each having a loudspeaker, a sensitive microphone and a master talking circuit comprising at least three wires; signalling means and additional calling lamps in each station; means including a manually operable selector switch and a relay in each station to connect a line from another station to the telephone instrument; non-resetting switching means in each substation for selecting and completing connections to a selected master talking circuit; means including locking key contacts in the substations mechanically releasable by the switch-hook to transfer the connection of the telephone instrument from the line wire circuit to said non-resetting switching means for selecting and switching through a master talking circuit; means including a series of keys at each substation to select one group of a number of groups of single line wires from other stations, said keys mechanically releasable by the switch-hook; and additional non-resetting switching means for selecting and switching through to an individual line wire of each group.

25. A system according to claim 24 wherein said non-resetting switching means and said additional non-resetting switching means comprise a combined multiwiper manually operable rotary selector switch.

ADOLF ERWIN ADLER.

REFERENCES CITED

The following references are of record in the file of this patent:

UNITED STATES PATENTS

| Number | Name | Date |
|---|---|---|
| 2,170,391 | Ruth | Aug. 22, 1939 |
| 2,179,652 | Waite | Nov. 14, 1939 |
| 2,181,715 | Waite | Nov. 18, 1939 |